United States Patent [19]

Loynes et al.

[11] 4,065,946

[45] Jan. 3, 1978

[54] TAMPER PROOF ATTACHMENT SYSTEM

[75] Inventors: Leslie M. Loynes; Darrel H. Walters, both of Angola; Clarence A. Penick, Jr., Hudson, all of Ind.

[73] Assignee: Brammall, Inc., Angola, Ind.

[21] Appl. No.: 658,907

[22] Filed: Feb. 18, 1976

[51] Int. Cl.² .............................................. E05B 73/00
[52] U.S. Cl. ........................................ 70/58; 70/232; 70/DIG. 57
[58] Field of Search ...................... 70/18, 57, 58, 230, 70/232, 258, DIG. 57; 85/53; 151/69

[56] References Cited

U.S. PATENT DOCUMENTS

| 3,174,383 | 3/1965 | Heil | 85/53 X |
| 3,561,236 | 2/1971 | Loughlin | 70/232 |
| 3,757,550 | 9/1973 | Kayser | 70/232 |
| 3,765,197 | 10/1973 | Foote | 70/58 |

Primary Examiner—Robert L. Wolfe

Attorney, Agent, or Firm—Hill, Gross, Simpson, Van Santen, Steadman, Chiara & Simpson

[57] ABSTRACT

A tamper proof attachment system is provided to secure a device such as a radio or tape deck in a vehicle. The looped cable passes through an anchoring point and the ends of the looped cable are locked and pass through an attachment device. The attachment device housing has an aperture in one end through which a mounting bolt is positioned and the head of the bolt is free to turn within the housing. The mounting bolt also passes through a mounting bracket and is threaded into a mounting surface of the vehicle. An open end of the attachment device housing is closed by a plug to cover the head of the bolt. In one embodiment the plug has apertures which align with apertures in the housing to permit the cable to pass through and to retain the plug in place. The device such as a tape deck or radio is fastened to the mounting bracket by bolts having tamper proof mounting covers according to the invention.

15 Claims, 6 Drawing Figures

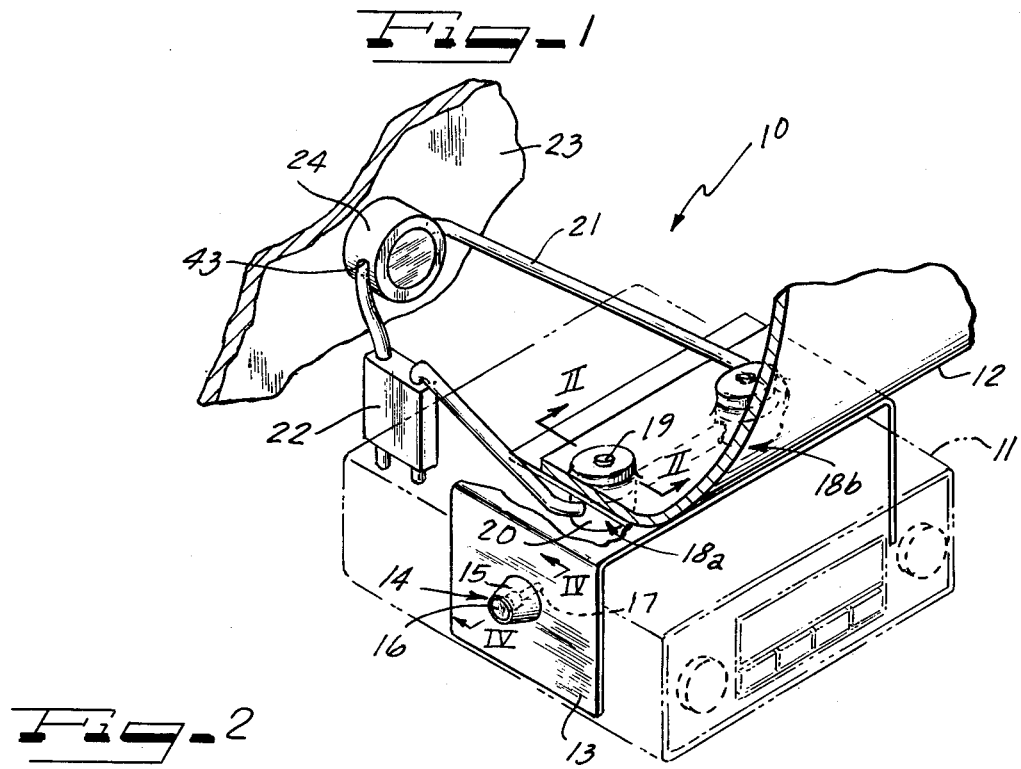
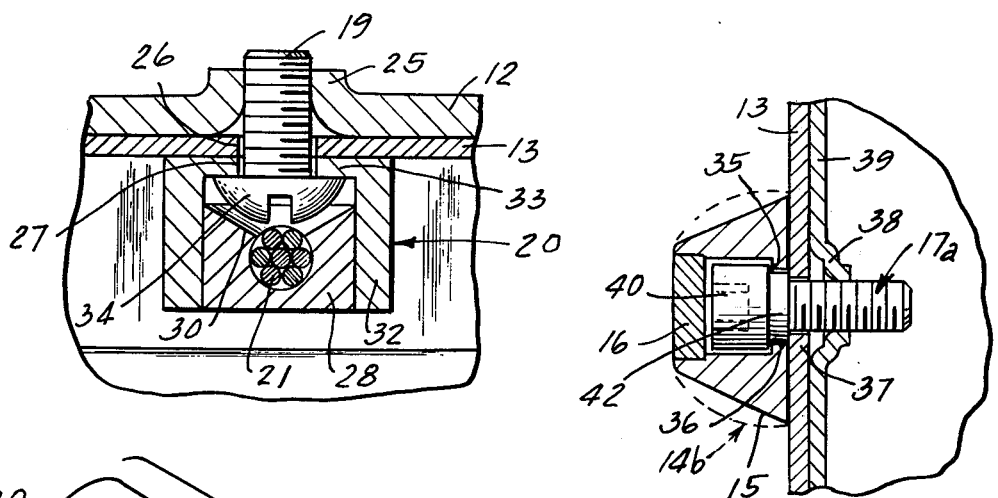
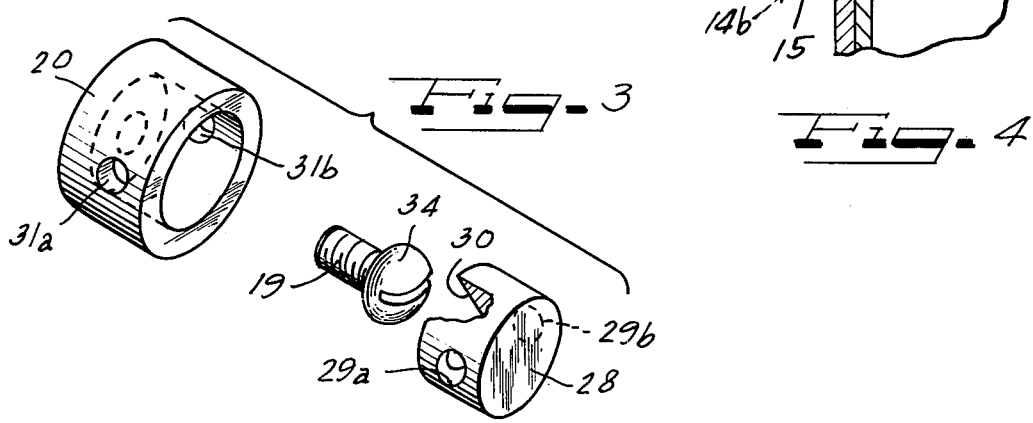

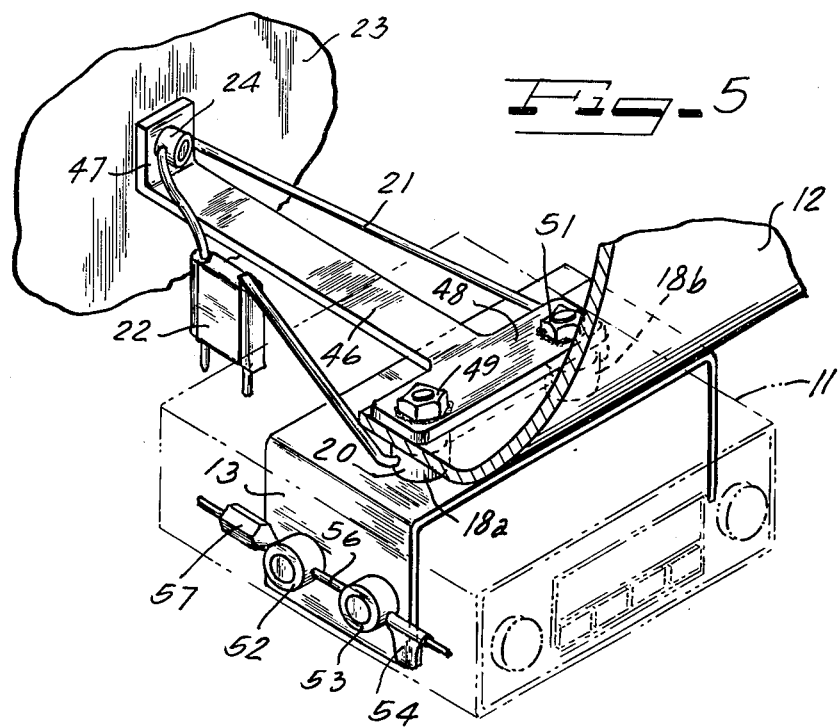
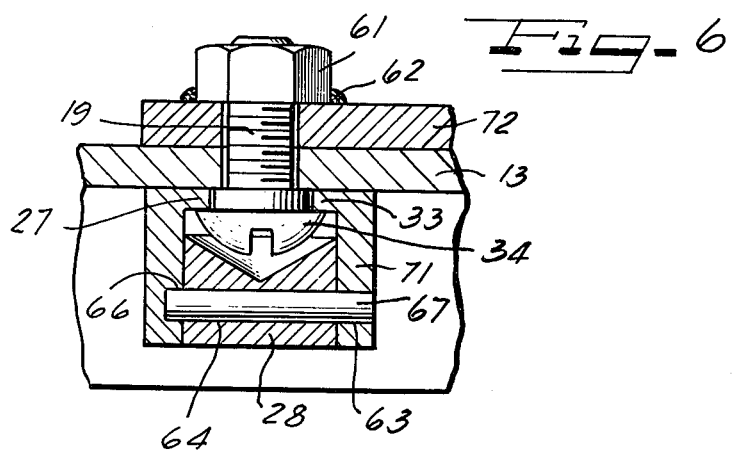

TAMPER PROOF ATTACHMENT SYSTEM

BACKGROUND OF THE INVENTION

1. Field of the Invention

This invention relates to tamper proof attachment systems having tamper proof bolts.

2. Description of the Prior Art

The unauthorized removal of electronic devices such as radios, stereos, or citizens band radios from motor vehicles has become a serious problem. Various systems have been designed to increase the difficulty of removing such items. Previous tamper proof attachment systems have either been too complicated, too expensive or were ineffective.

SUMMARY OF THE INVENTION

It is an object of the present invention to provide a tamper proof attachment system which is simple to install, yet is effective to prevent the unauthorized removal of valuable devices from a vehicle.

It is a further object of this invention to provide a lock and cable in combination with tamper proof bolts for attachment of a mounting bracket to a mounting surface.

In accordance with the present invention, a tamper proof attachment system has a cable and lock means which is attached to an anchoring point within the vehicle. An attachment device is provided having a cylindrical housing and one closed end with an aperture for a mounting bolt. A head of the mounting bolt loosely fits within the housing. A mounting bracket is attached to the mounting surface by positioning the mounting bolt through an aperture in the mounting bracket and threading the bolt into a mounting surface. A plug is inserted into an open end of the attachment device housing and is locked in place by positioning the cable through aligned apertures in the plug and housing walls.

The device to be secured is attached to the mounting brackets by use of one or more mounting bolts which are positioned through apertures in the bracket and threaded into sides of the device. A mounting bolt cover is loosely retained by a head of each of the mounting bolts. An open end of the cover is closed after mounting the device by inserting a press fit plug into an open end of the cover. The bolt cover is either conical or spherical to inhibit gripping with tools.

Other advantages and features of the present invention will become manifest to those versed in the art upon making reference to the detailed description and the accompanying drawing in which a preferred structural embodiment incorporating the present invention is illustrated.

BRIEF DESCRIPTION OF THE DRAWINGS

FIG. 1 is a perspective view of the tamper proof attachment system of the present invention;

FIG. 2 is a fragmentary cross sectional view taken along line II—II of FIG. 1;

FIG. 3 is an exploded view showing an attachment device in perspective;

FIG. 4 is a fragmentary cross sectional view taken along line IV—IV of FIG. 1 showing a mounting bolt and cover for securing the device to a mounting bracket;

FIG. 5 is a perspective view of a modification using two or more attachment devices; and FIG. 6 is a sectional view of a modification.

DESCRIPTION OF THE PREFERRED EMBODIMENTS

The principles of the present invention are particularly useful when embodied in the tamper proof attachment system 10 shown in FIG. 1. A device 11 such as a tape deck is secured to a vehicle mounting surface 12 by use of a U-shaped mounting bracket 13. The device 11 is typically a valuable electronic device such as a radio, tape player, or stereo system. The mounting surface 12 is preferably the vehicle dashboard but any other convenient surface will suffice.

The mounting bracket 13 is attached to the device 11 by mounting bolts 17 positioned in apertures on opposite sides of the mounting bracket 13 in the side walls. Mounting bolt covers 14 conceal the heads of the mounting bolts 17 to prevent removal of these bolts after installation.

Attachment devices 18a, b secure the mounting bracket 13 to the mounting surface 12. FIGS. 2 and 3 illustrate a device 18. A mounting bolt 19 is loosely retained within an attachment housing 20 and flexible cable 21 is positioned within apertures in side walls of the attachment housing 20 to block access to the head 34 of the mounting bolt 19. The cable 21 passes through another attachment device 24 which has apertures 41 and which is attached to fire wall 23. A lock 22 joins the ends of the cable 21. Although a cable is preferred, it should be obvious to those skilled in the art that a chain or a flexible rod could be substituted for the cable.

As shown in detail in FIGS. 2 and 3, the attachment housing 20 has a cylindrical wall 32 and a closed end 33 with an aperture 27 therein. The mounting bolt 19 is positioned through the aperture 27 and is retained within the housing 20 by the head 34 of the bolt 19. When the head 34 is not tightly drawn against the end wall 33, it should be noted that the housing 20 fits about the shank of the bolt 19. The mounting block 19 is threaded to engage a threaded embossment 25 on the mounting surface 12. Although the formation of an embossment is preferable, the invention is still useful with a threaded aperture having no raised portions. Furthermore, in the preferred form of the invention, the end of the bolt 19 extending above the threaded embossment 25 should not be too long to prevent unscrewing of the bolt 19 by gripping the end of the bolt. Typically, the bolt 19 should extend no more than one quarter of an inch above the threaded aperture 25.

After the bolt 19 has been tightened to secure the mounting bracket 13 into engagement with mounting surface 12, a plug 28 is inserted into an open end of the attachment housing 20. The plug 28 has a conical depression 30 to permit clearance for the bolt head 34. Apertures 29a, b are provided in side walls of the plug 28. These apertures align with further apertures 31a, b in the housing side walls and it is through these aligned apertures that the cable 21 is passed to lock the plug 28 in position.

As shown in FIG. 4, the mounting bolt 17a fastens a surface of the U-shaped mounting bracket 13 to the side wall 39 of the device 11. A notched flat head 40 of the mounting bolt 17a retains the mounting bolt cover 14a against the surface of the mounting bracket 13. The mounting bolt cover 14a has a conical or hemispherically shaped body portion 15 having a smooth outer surface formed of finished steel or chrome plating. A lip portion 35 on one end of the body portion 15 has an aperture 36 therein for receiving the mounting bolt 17a. A plug 16 press fits into an open end of the body portion 15. This plug is preferably non-magnetic and is knurled or tapered to allow for a press fit. The bolt 17a is positioned within an aperture 37 of the mounting bracket 13 and is threadedly engaged in a threaded raised portion 38 in wall 39 of the device 11. An unthreaded shoulder 42 of bolt 17a bears against bracket 13 as shown.

To assemble the attachment system, the attachment devices 18a, b are employed to secure the mounting bracket 13 onto the mounting surface 12. Bolts 19 having attachment housing 20 loosely retained thereon are screwed into the threaded embossment apertures 25. Thereafter, plugs 28 are positioned in the open ends of the attachment housings 20 and the cable 21 is inserted through the aligned apertures 31a, 29a, 29b, and 31b. The device 24 is attached to fire wall 23 and the end of the cable 21 is passed through apertures 43 in the anchoring device 24. The locking device 22 secures the free ends of the cable 21.

A device 11 is fastened to the mounting bracket 13 by positioning bolts 17a through apertures in the mounting bracket. These bolts are threaded into the threaded raised portions 38 of the side walls of device 11. Plugs 16 are then press fit into body portions 15 to cover the heads 40 of the bolts 17a.

The bolts 17a are not easily removable since the plug 16 cannot be pried loose from the body portions 15 or 14b. Furthermore, if a tool is used in an attempt to grip the body portions 15 or 14b the hemispherical or conical shapes prevent a solid grip. Also, even if the body portions are rotated, the bolts 17a are not loosened since the body portions fit loosely around the bolts and do not turn the bolts.

The bolts 19 which attach the mounting bracket to the mounting surface are tamper proof since the plugs 28 cover the heads of the bolts. Furthermore, if ends of the bolts extending above the threaded embossment apertures 25 are gripped and twisted, the tip of the bolt will become level with the raised portion and become flush therewith, thus preventing any further twisting.

The cable also attaches the entire unit to the vehicle as a further safety measure.

FIG. 5 illustrates a modification of the invention. A T bracket 46 of metal or other suitable material is formed with a portion 48 with two aligned openings through which the bolts 19 attaching devices 18a and 18b extend. The portion 48 has nuts 49 and 51 welded thereon for threadedly receiving the ends of bolts 19. An end portion 47 of T bracket 46 is bent at right angles to the main body portion and attaching device 24 fits through it and attaches the end 47 of the T bracket to the fire wall 23. The bracket 13 is held by the members 18a and 18b and the device to be secured 11 is attached to the bracket by four attaching devices 52, 53 and two others at the opposite end of the bracket not shown rather than with two devices 14 as shown in FIG. 1. Since the devices 52 and 53 are the same as devices 18a and 18b and 24, they are provided with aligned openings which can be horizontally aligned so that a locking device including a flag 54, a cable or rod 56 and a Cone Loc 57 can be extended through the openings of members 52 and 53 as shown so as to prevent them from being turned and to further secure the apparatus. Alternatively, a bicycle pad lock could be inserted into the openings 52 and 53 if desired.

The embodiment illustrated in FIG. 5 adds additional strength to the dashboard 12 and prevents the dashboard 12 from being rolled upwardly by gripping it below and pulling upward on it because the T bracket 46 is locked to the fire wall 23 by the member 24 and thus the lower edge of the dashboard 12 is reinforced.

A further modification of the device is illustrated in FIG. 6 wherein the plug 28 is locked to the outer housing 71 by pin 67 rather than by the cable 21. In this embodiment, a first opening 63 passes completely through the wall of the cylindrical member 71 but a second opening 66 formed from inside passes only partially through the wall of the cylindrical housing 71. Thus, when the plug 28 is inserted over the head 34 of the bolt 19, a pin 67 can be pressed fitted into the opening 63, through the opening 64 in the plug 28 and into the opening 66 of cylindrical housing 71. Since the pin 67 is press fitted into these openings, it cannot be easily removed nor can it be pushed out since the opening 66 does not extend completely through the member 71. The embodiment illustrated in FIG. 6 also illustrates a nut 61 welded by a welding bead 62 to the plate 72.

Although the invention has been described with respect to preferred embodiments it is not to be so limited as changes and modifications may be made therein which are within the full intended scope of the invention as defined by the appended claims.

We claim as our invention:

1. A tamper proof attachment system comprising an anchoring means;
    a cable and lock means attached to said anchoring means;
    a mounting bracket having an aperture;
    an attachment device means having a housing, a mounting bolt slidably received in an aperture located in one end of said housing, the head of said bolt loosely retained in said housing, and apertures in said housing through which said cable passes; and
    a mounting member with a threaded aperture for receiving said mounting bolt, said mounting bracket being secured between said attachment device means and said mounting member, and said mounting bolt extending through the aperture of said mounting bracket and into the threaded aperture of said mounting member.

2. The attachment system of claim 1 in which said housing has a plug closing an open end of said housing, and apertures provided in said plug aligned with the apertures in said housing, and said cable passing through the aligned apertures.

3. The attachment system of claim 1 in which said mounting bracket is connectible to a device to be secured by means including a second mounting bolt having a head portion, a mounting bolt cover receiving said second mounting bolt, said device having a threaded aperture and said second mounting bolt passing through said mounting bracket and threadedly received into the threaded aperture of said device.

4. The attachment system of claim 3 in which said mounting bolt cover comprises a conical shaped body portion having an open end, and a plug press fitted into said open end.

5. The attachment system of claim 3 in which said mounting bolt cover comprises a hemispherical shaped body portion having an open end and a plug press fitted into said open end.

6. The attachment system of claim 1 in which said threaded aperture of said mounting member comprises a raised embossment.

7. The attachment system of claim 1 in which the end of said mounting bolt protruding above said threaded aperture is minimal.

8. The attachment system of claim 1 in which said anchoring means is a vehicle fire wall and said mounting member is a vehicle dash panel.

9. A tamper resistant system for attaching a device to a member comprising a generally T-shaped bracket, an anchoring means connecting one end of said T-shaped bracket to said member, the other end of said T-shaped bracket formed with a pair of threaded apertures, a dashboard formed with a plate member formed with a pair of apertures aligned with said apertures in said T-shaped bracket, means attaching said device to said plate member, a pair of mounting bolts extending through said pair of apertures in said plate member and said dashboard and threadedly received into said threaded apertures of said T-shaped bracket, a pair of bolt head covering housings surrounding the heads of said mounting bolts and each formed with openings, and a fastening means extending through the openings in said covering housings and attached to said member or to said T-shaped bracket.

10. A system according to claim 9 wherein said anchoring device is formed with an opening and said fastening means extending through said opening.

11. A system according to claim 10 wherein said fastening means is a cable and locking means receiving the ends of said cable to lock them together.

12. A system according to claim 9 including a pair of plugs formed with openings and receivable in said bolt covering housing and covering the heads of said pair of mounting bolts and said fastening means passing through said openings in said pair of plugs.

13. A security device comprising a bolt, a housing with an opening through which said bolt extends in a depression into which the head of said bolt is received, a plug receivable into said depression over the head of said bolt, and aligned openings formed through said plug and said housing, and a pin press fitted into said aligned openings of said plug and said housing such that one end of said pin extends through said housing and the other end does not extend through said housing.

14. A tamper proof attachment system adapted for securing a device in a vehicle comprising:

an anchoring means attached to said vehicle;

a cable and lock means attached to said anchoring means;

a mounting bracket having an aperture;

an attachment device means having a housing with a pair of aligned apertures, a plug with a pair of aligned apertures fitting into an open end of said housing, a mounting bolt slidably received in said housing with the head of said bolt loosely mounted in said housing, said cable passing through said aligned apertures in said housing and said plug;

a vehicle mounting member having a threaded aperture for receiving said mounting bolt, said mounting bolt extending through said mounting bracket, and threadedly received into said mounting member, said device formed with a pair of threaded apertures;

second and third mounting bolts passing through apertures in said mounting bracket on each side thereof and threadedly engaged in said apertures of said device, a pair of tamper proof mounting bolt covers surrounding said second and third mounting bolts.

15. The attachment system of claim 3 in which said mounting bolt cover comprises a shaped body portion having an open end and an outer surface which is difficult to grip, and a cover member receivable over said open end.

* * * * *